INVENTOR
TENNY D. LODE

United States Patent Office 3,453,536
Patented July 1, 1969

3,453,536
COMMON POWER SUPPLY RESISTANCE BRIDGE SYSTEM PROVIDING EXCITATION, INDIVIDUAL BRIDGE SENSOR RESISTANCE, AND SIGNAL OUTPUT TERMINALS ALL REFERENCED TO A COMMON POTENTIAL
Tenny D. Lode, Madison, Wis., assignor to Rosemount Engineering Company, Minneapolis, Minn., a corporation of Minnesota
Continuation-in-part of application Ser. No. 425,560, Jan. 14, 1965. This application Sept. 19, 1966, Ser. No. 580,259
Int. Cl. G01r 27/14
U.S. Cl. 324—62   3 Claims

ABSTRACT OF THE DISCLOSURE

A measuring system including a plurality of resistance bridges is designed in a manner to provide grounded resistance sensors, grounded signal outputs and energization from a common power supply which is also referenced to ground. The system is also shown to be suitable for use with resistance sensors having four leads and operating in a Kelvin double bridge configuration.

---

Figure 1:
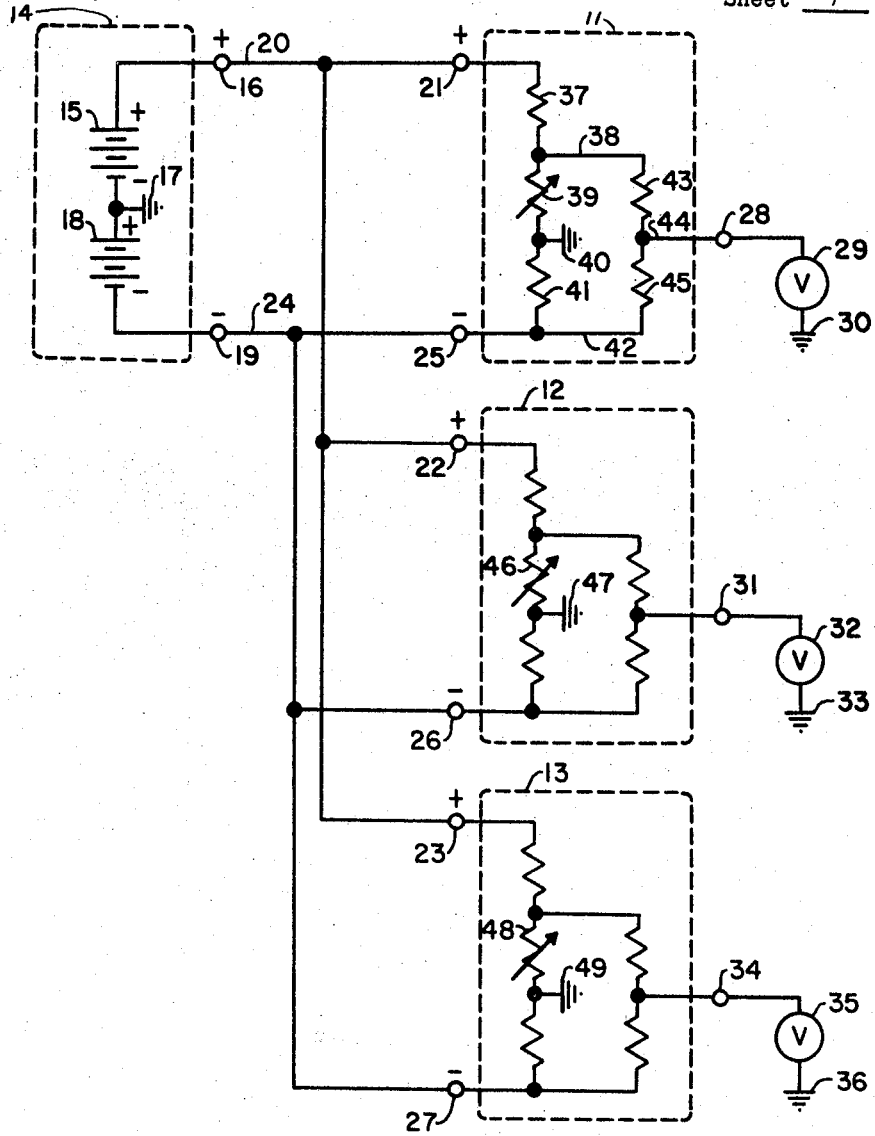

This application is a continuation-in-part of a previous application for Resistance Bridge Circuit, filed Jan. 14, 1965, Ser. No. 425,560 and now abandoned.

This invention relates to the measurement of the electrical resistance of variable resistance temperature sensors and other devices. More particularly, it relates to systems for the operation of a plurality of resistance bridge circuits from a common power supply and with one side of each of their output circuits connected to a ground or other common potential point.

Variable resistance sensors are useful for the measurement of temperature, mechanical strain, pressure and other physical quantities. Precise temperature sensors are constructed with wound platinum wire resistance elements. When such a resistance thermometer has been properly calibrated, its resistance will be an accurate indication of its temperature. Variable resistance sensors are convenient and useful because of the ease of electrical resistance measurement. In most instances, the sensor resistance is measured with a bridge circuit which generates a voltage or current which may be transmitted to other apparatus. In the conventional Wheatstone bridge circuit, four resistors are connected in a pattern resembling the sides of a square. A voltage source is connected across one pair of opposite junction points, and a voltage measuring device is connected across the remaining pair of opposite junction points. If the power supply voltage and the values of three of the resistors are known, the magnitude of the fourth resistance may be determined from the magnitude and polarity of the bridge output voltage.

A characteristic of conventional resistance bridge circuits is that either the power supply or one of the output terminals, but not both may be grounded. In single bridge systems this is usually of little consequence. The power supply may be left floating and the output circuit grounded or not as desired. However, this characteristic can be a significant disadvantage in multiple bridge systems.

In multiple bridge systems it is frequently desirable to be able to ground the bridge output circuits. This allows the output signals to be transmitted to some other location with one wire per channel plus a common ground instead of two wires per channel. It also allows the output signals to be sampled or scanned with a single-pole scanning switch instead of a double-pole scanning switch. However, with conventional bridge circuits, grounding the bridge outputs requires that an individual floating power supply be used for each bridge circuit. It would obviously be desirable to be able to use a common power supply for a number of individual resistance bridge circuits while still being able to ground their outputs. In general, if the power supply circuit can be grounded, a common power supply can be used for a plurality of bridge circuits.

It is not difficult to devise resistance measurement circuits which may be operated from grounded power supplies and which will have grounded signal outputs. For example, a single fixed resistor and a variable resistance sensor could be connected in series between a positive potential line and a ground potential line. The voltage between the junction of the two resistors and ground would then be a measure of the sensor resistance. However, for practical reasons, it is usually desirable to have the voltage output of a resistance measurement circuit be zero for some nominal value of sensor resistance. This allows the more precise measurement of the sensor resistance, particularly near its nominal reference value. Such simple resistance measuring circuits also suffer from the disadvantage that the measured sensor resistance is the sum of the actual sensor resistance and the resistances of any leads between the sensor and the bridge circuit. This may become a significant problem in certain instrumentation applications in which the sensor may be separated from the bridge circuit by several hundred feet or more. The Kelvin double bridge circuit was devised in the 19th century to reduce such lead resistance errors. Conventional double bridge circuits require a floating power supply and/or a floating indicator circuit. Hence, conventional multiple double bridge systems which allow grounding of the bridge outputs require an individual floating power supply for each bridge circuit.

An object of this invention is to provide methods and means for the measurement of resistance sensors and other resistance elements in terms of voltages and/or currents. A further object is to allow the operation of a plurality of resistance bridge circuits from a common grounded power supply and with grounded outputs.

In a particular form of the present invention, a common dual output power supply provides positive and negative unidirectional voltages of equal magnitude with respect to a ground potential point. A number of individual resistance bridge circuits are connected in parallel to the common power supply. Within each bridge circuit, a first fixed resistor and a variable resistance sensor connect in series in that order from the positive power supply line to a ground point. Second and third fixed resistors are connected in series from the negative power supply line to the junction of the first fixed resistor and the sensor. A fourth fixed resistor is connected from the negative supply line to the bridge circuit ground point. The circuit output voltage is taken from the junction of the second and third fixed resistors. With a proper selection of resistance values, the voltage output with respect to ground will be zero for some nominal value of sensor resistance. The output voltage will become positive or negative as the sensor value increases or decreases from its nominal value. This form of the invention is illustrated in FIGURE 1 and will be described in greater detail.

Figure 2:
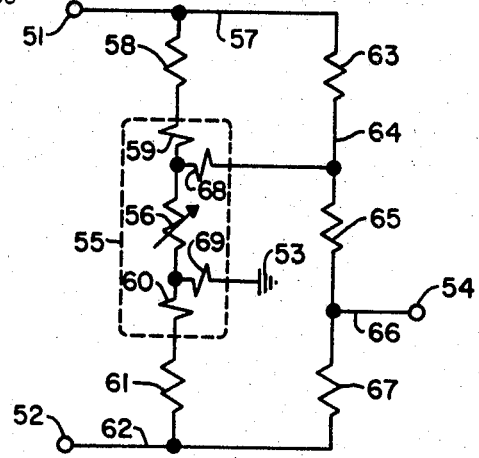
Figure 3:
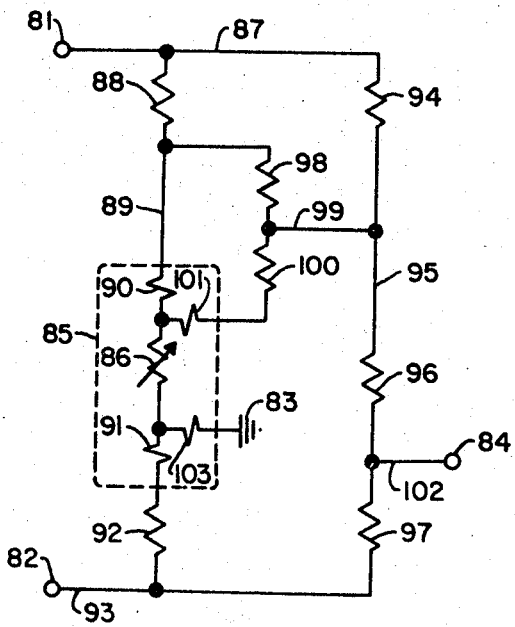

In the drawings:
FIGURE 1 is a schematic illustration of a first form of the invention showing the connection of three grounded output resistance bridge circuits to a single common power supply;
FIGURE 2 is a schematic illustration of a bridge circuit which may be used in place of one or more of the bridge sensor lead resistance compensation comparable to the circuits in the system of FIGURE 1 and which provides Kelvin double bridge circuit; and FIGURE 3 is a schematic illustration of a further alternate bridge circuit which may be used in place of one or more of the individual bridge circuits of FIGURE 1 and which provides further compensation for lead resistance variation effects.

Referring now to the drawings, FIGURE 1 includes grounded output resistance bridge circuits 11, 12 and 13 which are connected in parallel to power supply 14. Power supply 14 includes battery 15 connected between positive power output terminal 16 and ground 17. Battery 18 is connected between ground 17 and negative power output terminal 19. Line 20 connects from terminal 16 to terminals 21, 22 and 23. Line 24 connects from terminal 19 to terminals 25, 26 and 27. The output of bridge circuit 11 appears on terminal 28 which connects to a first side of voltmeter 29. The second side of voltmeter 29 connects to ground 30. Similarly, the output of bridge circuit 12 appears on terminal 31 which connects to a first side of voltmeter 32, and the output of bridge circuit 13 appears on terminal 34 which connects to a first side of voltmeter 35. The second side of voltmeter 32 connects to ground 33, and the second side of voltmeter 35 connects to ground 36. Within bridge circuit 11, power terminal 21 connects through resistor 37 to line 38 and a first side of variable resistor 39. The second side of variable resistor 39 connects to ground 40 and a first side of resistor 41. The second side of resistor 41 connects to line 42 and power terminal 25. Resistor 43 connects from line 38 to line 44 and terminal 28. Resistor 45 connects from line 44 to line 42 and power terminal 25. Bridge circuit 12 includes variable resistor 46 and ground 47, and bridge circuit 13 includes variable resistor 48 and ground 49. Bridge circuits 12 and 13 are substantially similar to bridge circuit 11.

In the circuit of FIGURE 1 the two power supply voltages on terminals 16 and 19 are assumed to be of equal magnitude but opposite polarity with respect to ground. Suitable values would be plus and minus 50 volts. Representative characteristics of variable resistor 39 would be a nominal center value of 100 ohms and a variation over a range of 50 to 150 ohms for the range of temperature, pressure or other quantity being measured. Representative values for the other resistors of bridge circuit 11 would be 39,920; 50,000; 500; and 250,000 ohms for resistors 37, 41, 43 and 45 respectively. With these values, the voltage output on terminal 28 will be substantially zero for the nominal sensor resistance of 100 ohms. For sensor resistances of 50 and 150 ohms, the bridge voltage output will be respectively minus and plus approximately .001 times the power supply voltages. The voltage outputs of bridge circuits 12 and 13 on terminals 31 and 34 will similarly reflect the values of variable resistances 46 and 48. Thus, the system of FIGURE 1 provides a plurality of grounded bridge circuit outputs, allows a zero output voltage for a nominal non-zero value of the variable resistance being measured, and requires only one power supply for the plurality of bridge circuits.

The current through ground 40 will be equal to the difference of the currents through resistors 39 and 41. For the nominal 100 ohm value of resistor 39, these two currents will be essentially equal and the current through ground 40 will be substantially zero. As the resistance of resistor 39 varies about its nominal value, the currents through resistors 39 and 41 will remain nearly equal so that the current through ground 40 will remain at a small value. Using the representative values given perviously, the current through ground 40 will be substantially zero for a sensor resistor value of 100 ohms. The maximum current through ground 40 will be approximately $10^{-6}$ amperes for the extreme sensor resistor values of 50 or 150 ohms. Intermediate sensor resistance values will result in intermediate ground current magnitudes. By limiting the ground currents to such extremely small values, any errors due to finite ground path resistances are greatly reduced.

Reference is now made to FIGURE 2 which is a schematic illustration of an alternate form of bridge circuit arranged for the suppression of the effects of variations of certain lead resistances. FIGURE 2 includes power input terminals 51 and 52, ground 53 and output terminal 54. Variable resistance sensor 55 includes sensor resistor 56 and four leads whose resistances are represented by lead resistances 59, 60, 68 and 69. Terminal 51 connects through line 57 to a first side of resistor 58. The second side of resistor 58 connects through lead resistance 59 to a first side of sensor resistor 56. The second side of sensor resistor 56 connects through lead resistance 60 and resistor 61 to line 62 and terminal 52. Resistor 63 connects from line 57 to line 64 and a first side of resistor 65. The second side of resistor 65 connects to line 66, which connects through resistor 67 to line 62 and terminal 52. Line 66 connects to output terminal 54. Lead resistance 68 connects from the first side of sensor resistor 56 to line 64, and lead resistance 69 connects from the second side of sensor resistor 56 to ground 53.

A disadvantage of simple bridge circuits such as bridge circuit 11 of FIGURE 1 is that they offer only somewhat limited suppression of the effects of varying resistance in the leads connecting variable resistor 39 to the rest of the bridge circuit. As mentioned previously, it may be desirable to place sensor resistor 39 some distance away from the remainder of the bridge circuit. In such instances, lead resistances may become a significant source of error. The circuit of FIGURE 2 is a modified form of double bridge which reduces certain effects of lead resistance variations and which operates from a dual polarity grounded power supply. As in the case of FIGURE 1, we will assume that variable resistor 56 has a nominal value of 100 ohms and that it may vary over a range of 50 to 150 ohms. Power input terminals 51 and 52 are assumed to be connected to a source of equal magnitude, opposite polarity voltages with respect to ground, such as power supply 14 of FIGURE 1. Representative bridge resistor values would be 49,900; 50,000; 249,500; 500; and 250,000 ohms for resistors 58, 61, 63, 65 and 67 respectively. With these values, the output voltage between terminal 54 and ground will be approximately minus .001, zero, and plus .001 times the power supply voltage, for sensor resistor values of 50, 100, and 150 ohms.

The circuit of FIGURE 2 may be substituted for one or more of the bridge circuits of FIGURE 1. For example, it may be substituted for bridge circuit 11 by connecting terminals 51, 52 and 54 to terminals 21, 25 and 28 respectively.

Now let us examine the suppression of lead resistance variation effects by the bridge circuit of FIGURE 2. The sensor current flows from terminal 51 through line 57, resistor 58, lead resistance 59, sensor resistor 56, lead resistance 60 and resistor 61 to line 62 and terminal 52. Because of symmetry, only minute unbalance currents will flow through lead resistances 68 and 69. Hence, any variation in the magnitudes of lead resistances 68 and/or 69 will have little effect upon the circuit output voltage or current. Current through lead resistance 60 and resistor 61 may be viewed as flowing between terminal 52 and ground 53 via lead resistance 69. The principal effect of a small change in this current will be to change the small difference current flowing through lead resistance 69. Hence, variations of lead resistance 60 will have little effect upon the circuit output signal.

A variation of lead resistance 59 will appear as a similar variation of the value of resistor 58. A change in the total resistance of the series combination of resistor 58 and lead resistance 59 will change the current through sensor resistor 56. Hence, changes in lead resistance 59 will cause small changes in the circuit output voltage. However, the magnitude of these changes will be small as the magnitude of the resistance change will be small in comparison with the total resistance of resistor 58 and lead resistance 59. For example, with the previously given values, a change of 1 ohm in lead resistance 59 will cause a change in the circuit output voltage of approximately one part in 50,000 of the voltage across sensor resistor 56. The absence of significant currents through ground 53 reduces the likelihood of errors being introduced because of resistance in the ground circuit.

A major advantage of the modified double bridge circuit of FIGURE 2 is the suppression of lead resistance errors. This error suppression is achieved at the expense of reducing the relative bridge output voltage (or current). With the representative resistance values given previously, the full scale bridge output voltage is only .001 times the power supply voltage. However, in many precision measurement applications, the suppression of lead resistance errors is of far greater importance than a high bridge output voltage. The representative bridge resistance values given previously were calculated on the assumption that errors due to the variations of the various lead resistances of FIGURE 2 were to be individually minimized. As was seen in the previous description, it is possible to reduce the effects of variations of lead resistances 60, 68 and 69 to negligible values. However, it was not possible to independently eliminate the effects of variations of lead resistance 59.

In some instances, it will be justified to assume that the lead resistances are of nearly the same value and that they vary together. For example, sensor resistor 56 may be located several hundred feet from the remainder of the bridge circuit. Lead resistances 59, 60, 68 and 69 would then represent the resistances of the long leads. If the leads were constructed of the same type wire, their resistances would be nearly equal. The changes in lead resistance would be due to such factors as variations in the local temperature and/or solar heating. Under such conditions, the resistances of the various lead wires would tend to vary together and to remain nearly equal in spite of significant variations in their absolute values. If desired, different values may be chosen for the resistors of FIGURE 2 so as to cause the bridge output voltage to vary slightly with changes in the values of lead resistances 60, 68 and/or 69. With properly chosen bridge resistor values, the sum of the bridge output voltage variations due to simultaneous variation of each of the four individual lead resistances may be made nearly zero. An output signal variation in one direction due to a change in lead resistance 59 will be opposed by equal but opposite output signal variations due to changes in lead resistances 60, 68 and/or 69. Such cancellation will usually be achieved by choosing bridge resistance values such that small currents normally flow through lead resistances 68 and/or 69.

It may be noted that the connections to sensor resistor 56 are of the type sometimes referred to as a four-terminal connection arrangement. There are two current connections, through lead resistances 59 and 60, and two voltage connections, through lead resistances 68 and 69. This four-terminal connection arrangement may also be used in the bridge circuits of FIGURE 1, such as bridge circuit 11. The details of a four-wire connection of resistor 39 within bridge circuit 11 may be readily seen by noting that disconnecting resistor 63 of FIGURE 2 will change the circuit of FIGURE 2 into substantially the circuit of bridge circuit 11.

Reference is now made to FIGURE 3 which is a schematic illustration of a second alternate form of bridge circuit arranged for the further suppression of the effects of certain lead resistance variations.

FIGURE 3 includes power input terminals 81 and 82, ground 83 and output terminal 84. Variable resistance sensor 85 includes sensor resistor 86 and four connecting leads whose resistances are represented by lead resistances 90, 91, 101 and 103. Terminal 81 connects via line 87 to a first side of resistor 88. The second side of resistor 88 connects to line 89 which connects through lead resistance 90 to a first side of sensor resistor 86. The second side of sensor resistor 86 connects through lead resistance 91 and resistor 92 to line 93 and terminal 82. Resistor 94 connects from line 87 to line 95 which connects through resistor 96 to line 102. Line 102 connects through resistor 97 to line 93 and terminal 82. Resistor 98 connects from line 89 to line 99 which connects to line 95. Line 99 connects through resistor 100 and lead resistance 101 to the first side of sensor resistor 86. Line 102 connects to output terminal 84. Lead resistance 103 connects from the second side of sensor resistor 86 to ground 83.

As mentioned previously, the circuit of FIGURE 2 allows effective suppression of the effects of variations of three out of the four lead resistances, or for all four lead resistances if they are assumed to vary together. The circuit of FIGURE 3 generally resembles the circuit of FIGURE 2 except for the addition of bridge resistors 98 and 100 which allow the independent elimination of the effects of variation of the fourth lead resistance. Sensor resistor 86 is again assumed to vary over a range of 50 to 150 ohms and to have a nominal center value of 100 ohms. Representative values for the other resistors of the circuit of FIGURE 3 would be 49,900; 50,000; 249,500; 500; 250,000; 49,900; and 100 ohms for resistors 88, 92, 94, 96, 97, 98 and 100, respectively. Power input terminals 81 and 82 are assumed to be connected to a source of equal magnitude, opposite polarity voltages with respect to ground, such as power supply 14 of FIGURE 1.

The effects of variations of lead resistances 91, 101 and 103 may be substantially eliminated in the manner described for the circuit of FIGURE 2. As may be noted, the ratio of resistor 98 to resistor 100 is the same as the ratio of resistor 88 to the average value of sensor resistor 86. If lead resistance 90 should increase, the current flowing through resistor 88, lead resistance 90 and sensor resistor 86 will decrease. The voltage drops across resistors 88 and 86 will decrease slightly with the result that the voltage on line 89 will increase slightly while the voltage at the junction of lead resistances 90 and 101 will decrease slightly. The ratio of the magnitudes of these two voltage changes will be substantially equal to the ratio of the magnitudes of resistors 88 and 86. The directions of these two voltage changes will be opposite. Resistors 98 and 100 form a voltage divider which sums and cancels the two voltage changes. Hence, in the circuit of FIGURE 3, the bridge output voltage between terminal 84 and ground will be substantially independent of small variations in lead resistances 90, 91, 101 and 103, either individually or in any combination.

The circuit of FIGURE 3 may be substituted for one or more of the bridge circuits of FIGURE 1. For example, it may be substituted for bridge circuit 11 by connecting terminals 81, 82 and 84 to terminals 21, 25 and 28 respectively.

The drawings and the preceding description have shown bridge systems constructed in accordance with the present invention and operated from a battery power supply. Other sources of unidirectional voltage and current may also be used. The use of two voltages which are of equal magnitude but opposite polarity with respect to a reference potential point is convenient but not necessary. In some instances, it may be desirable to design the bridge circuit for operation with power supply voltages which are of unequal magnitude. If desired, such systems may be operated with alternating voltage and current sources and the bridge outputs taken as alternating voltage or current signals. The terms "polarity" and "opposite polarity" in the claims are intended to include the meanings of phase and opposite phase when applied to alternating voltage and current systems.

The preceding description has implied that the various bridge circuits were operated in an unbalanced mode. That is, all bridge resistors except a particular unknown or sensor resistor were of known and substantially fixed value, and the unknown resistance was measured in terms of the voltage or current output of the bridge circuit. If desired, such bridge circuits may also be operated in a balanced mode in which one or more bridge resistors are adjusted to bring the bridge output to a null or other predetermined condition. The unknown resistor is then measured in terms of the known resistor setting required to balance the bridge. For example, resistor 43 of FIGURE 1, resistor 65 of FIGURE 2, or resistor 96 of FIGURE 3 may be used in such a manner as a known adjustable resistor.

The preceding description has shown the use of a single sensor or variable resistance in the various bridge circuits illustrating the invention. In some instances, it will be desirable to construct such bridge circuits in which two or more resistances are variable. For example, resistor 65 of FIGURE 2 may be a four-lead variable resistance sensor. Line 64, the line connected to lead resistance 68, line 66, and the lead connected to resistor 67 would serve as the four leads to resistor 65. The bridge output voltage would then correspond substantially to a weighted difference of the values of resistances 56 and 65. Such multiple variable resistance systems may be used in applications such as the measurement of temperature difference.

What is claimed is:

1. A resistance measurement system including first and second power terminals and a reference terminal, means providing a first voltage of a first polarity between the first power and reference terminals, means providing a second voltage of a second and opposite polarity between the second power and reference terminals, a plurality of resistance bridge circuits each of which comprises a separate first resistance to be measured, a separate signal output terminal, a separate second resistance connecting the first power terminal to a first side of the first resistance, separate means connecting the second side of the first resistance to the reference terminal, a separate third resistance connecting the first side of the first resistance to the separate output terminal, a separate fourth resistance connecting the separate output terminal to the second power terminal, and a separate fifth resistance connecting the second power terminal to the second side of the first resistance, and at least one voltage indicating means connecting across one of the output terminals and the reference terminal.

2. The measurement system of claim 1 wherein the bridge circuits are characterized by the first resistances having a first lead connecting the first side to the second resistance, a second lead connecting the first side to the third resistance, a third lead connecting the second side to the fifth resistance, and a fourth lead connecting the second side to the reference terminal, and by having a sixth resistance connecting the first power terminal to the third resistance.

3. The measurement system of claim 1 wherein the resistances of each of the bridge circuits are selected so that zero current flows between the second side of the first resistance and the reference terminal at a prescribed value of the first resistance and wherein a prescribed maximum change of resistance to be measured is of the order of magnitude of one thousand times smaller than the series combination of the second, first, and fifth resistances, so that the maximum current between the second side and the reference terminal will be relatively small throughout measurements of changes of resistance of the first resistance.

References Cited

UNITED STATES PATENTS 2,504,965  4/1950  Davis _____ 324—62
3,292,081  12/1966  Kondo et al. _____ 324—57

EDWARD E. KUBASIEWICZ, *Primary Examiner.*

U.S. Cl. X.R.

73—362